Dec. 10, 1957  P. GRAHAM  2,815,872
VEHICLE PARKING DEVICE
Filed Nov. 29, 1954  5 Sheets-Sheet 1

INVENTOR.
Phillip Graham
BY
ATTORNEY

Dec. 10, 1957 P. GRAHAM 2,815,872
VEHICLE PARKING DEVICE
Filed Nov. 29, 1954 5 Sheets-Sheet 5

INVENTOR.
Phillip Graham
BY
ATTORNEY

2,815,872
VEHICLE PARKING DEVICE

Phillip Graham, Pittsburgh, Pa.

Application November 29, 1954, Serial No. 471,810

4 Claims. (Cl. 214—16.1)

My invention relates to a vehicle parking device which can be readily used to raise and park vehicles above the ground level. My vehicle parking device is useful to raise and park vehicles in tiers in what would otherwise be space unused for economical parking. This invention is a continuation-in-part of my co-pending application, Serial No. 248,416, filed September 26, 1951, now Patent No. 2,695,716 issued November 30, 1954, entitled, Vehicle Parking Device.

My vehicle parking device can be set up temporarily or permanently on available surfaces, such as parking lots, floor surfaces, roof surfaces, and the like. The supports for the parking device take up such a small amount of space that they are not highly objectionable. The parking device can be quickly erected and dismantled in parking lots without materially disturbing the surface.

The device is relatively inconspicuous as compared to other types of parking structures since its structure occupies a relatively small amount of vertical area. Thus, it allows visibility through its framework. The structure blocks very little daylight or circulation of air. The small vertical area of the structure resists hurricane-like winds and the like. The parking device is open which allows dangerous fumes to readily escape, and possible fires in autos would be readily accessible to fire fighters.

Other and known parking devices are, in general, permanent installations that have the disadvantage of requiring large structures that are more costly to build, maintain, and operate than my parking device. They require costly powered elevators or longer ramp space for the same amount of parking area. They cannot be economically set up and used for a short period and then be moved to a new site for economical reuse as can my parking device. Conventional parking devices cannot be set up in a narrow space and permit use of the valuable ground level space for other purposes.

My parking device is devoid of the above named disadvantages and allows the capacity of a parking lot to be multiplied, in some arrangements they would be tripled or more, as cars are stacked on tiltable racks or runways.

When the space for the parking device is between the sidewalk and the street, cars can be parked high above the ground but not at the street level when street level parking is deemed objectional. Visibility at the street level from the sidewalks, street, and the first floors of adjacent buildings would not be obstructed by my parking device. When autos are not parked on the ground level below the parking device, the structure may be used as a shelter for activities on the ground level.

When cars are parked high on my device, car theft and vandalism is discouraged since the cars are not as easily accessible and can be more readily seen by passersby. Since my parking device raises cars high above the ground level it protects the cars from tidal or fresh water floods.

New and used car sales lots and showrooms can employ my parking device to park and display cars in tiers; and, if desirable, the parking device may be rotated to better display the cars. Thus many more vehicles may be better displayed along a valuable frontage.

My parking device can also be used to ramp vehicles from the ground surface to second or third levels of a building and the like, in addition to parking cars on the parking device.

The vehicle parking device, embodying the principles of my invention, is similar in principle to a double-decker seesaw with vehicles spaced on it, as children would be on a seesaw. Parking devices may be set up in pairs to help load each other. There are modifications, such as a single seesaw or runway, similar in principle to a child's seesaw.

The double-decker, or parking device with two tiers of runways will be described in general. It includes a runway which has a track on which to park and a walkway along the side. It has two rails for engaging the vehicle wheels. The tilting runways are pin-connected to a fulcrum structure which is generally made of two A frames. The fulcrum is similar in principle to a saw-horse in a child's seesaw. The fulcrum may be other supports, as building columns and walls. The runways rock or pivot on the pins. The runways act both as ramps and parking surfaces. The fulcrum base may include a carriage means and a turntable means. The carriage wheels may engage a stretch of track on the parking lot and the like. When conditions are such that a turntable or carriage means is not feasible, the fulcrum base may be bolted to concrete footings. The top and bottom runways are linked together and therefore act together when tilting. The bottom runway, when in horizontal position, is high enough off the ground to clear usual ground level activities and to clear any vehicles in the space below.

The ends of runways may have tilted aprons to allow clearance at various ramped positions for the bumpers and other low parts of the vehicles. These tilted aprons allow the use of shorter, lighter, and less costly runways. The runways may have means to extend their ends and allow them to engage an accessible level when positioned at a slope or horizontally. The runways may have automatic wheel stops to block the ends against the passage of vehicles when the ends are not adjacent to an access level.

In general, a pair or series of similar units are set up. The upper tier of a unit is loaded with the help of the adjacent unit, which is used to ramp vehicles to the top runway. A unit may be used singly, but it generally requires an access driveway or a shifting space on a high level. The vehicle is driven off one runway onto a shifting space, then the runways are tilted to bring the other runway into alignment with the level of the shifting space so the vehicle may be ramped back onto the parking device and moved to a higher or lower elevation. The runways on the parking device are usually kept in horizontal position when the unit is filled, or when it is not being used; and the clear space below is then available for use without interference from these runways. The runways are balanced so that an end of a runway on an unloaded parking device can be pulled down, or a movable weight on a runway may be moved off-center to unbalance or create a greater moment on one end of the parking device, thus allowing one end of the lower runway to tilt to touch the ground. Since the runways are linked together, they work simultaneously.

A system of latches holds the runways in various positions. Hydraulic cylinders on the device have a bleeding means to retard the tilting speed. A master control system is hooked up to the hydraulic cylinder retarders and to the latches to control the movement of the runways. The master control cables, with feeders, can be reached by the operator from any location to operate the parking device, that is, from any vehicle parked thereon, or from the ground level. A delay action mechanism that is responsive to a pull on the master control cable opens the retarder bleeding valves, and latches open for short periods while the runways are being tilted to a required position. The parking device has a turntable means to rotate it for selective positioning, and a carriage means to move it along a stretch of a parking site and the like for ramping and parking cars at various levels. The wide latitude of the various selective positioning means allows, to a large extent, self-service in parking and removing cars since there are means to avoid excessive blocking of cars by other cars.

In general, the parking device is tilted and loaded. This seesaw, pivoting or tilting movement may be controlled by shifting the moments of the runways about the fulcrum pins. This is done by parking the vehicles on the runways outwardly enough so as to create the desired maximum moment to cause tilting action. Moving these vehicles to positions where they unbalance the runways causes moment changes and the runways will tilt about the fulcrum pin. This action tilts up the ends of the runways which have a lesser moment about the fulcrum pins. The moment involves a force tending to rotate a load about a given point, in this case, the fulcrum pins. The moment equals the weight or force times the distance from the fulcrum pins. An automatic indicator registers which end of the parking device has the greater moment when the runways are latched in a given position. To prevent the accidental tilting of the device onto a person, vehicle, or other obstruction on the ground level, a safety screen below the lower runway trips the hydraulic cylinder means to stop the bleeding action and thus the tilting action. Automatic stops at the ends of the runways block the vehicle wheels when the runway ends are not positioned for access to other runways or access levels. Power means may be used to tilt the runways. Power means on the parking device may be used to move the cars along the runways.

A broad object of my invention is to economically, easily and quickly store a large number of vehicles in a space above a small area by means which can be readily assembled.

Other objects and advantages of my invention will become apparent from a study of the following specification taken with the accompanying drawings wherein.

Figures 1, 2, 3, 4, 5, 6, 7, 8:
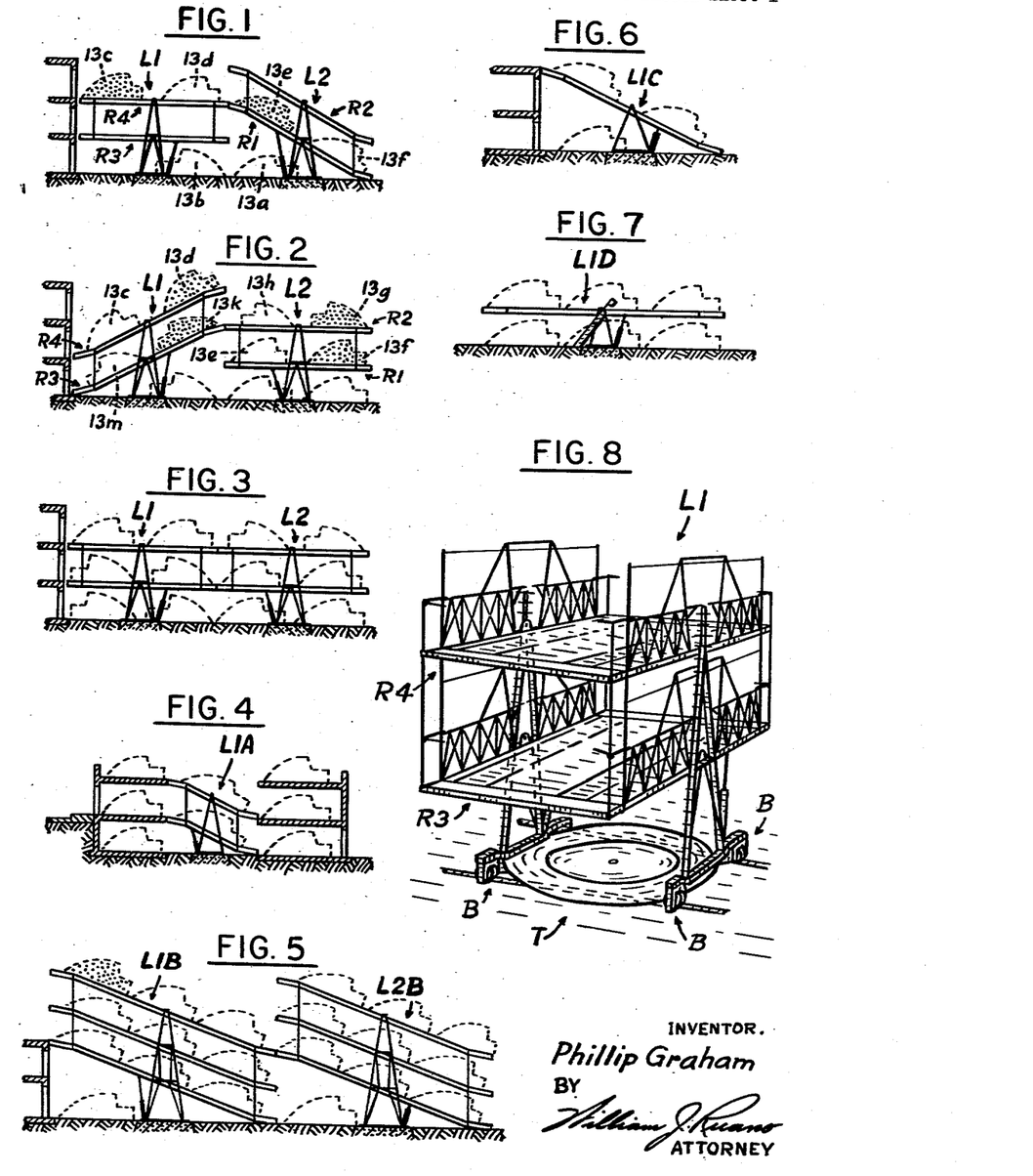
Fig. 1 is a schematic diagram showing an elevation of parking devices L1 and L2, in one of the positions in the loading sequence.
Fig. 2 is a schematic diagram showing an elevation of parking devices L1 and L2 in a different position in the loading sequence.
Fig. 3 is a schematic diagram showing an elevation of parking devices L1 and L2 with the parking space filled.
Fig. 4 is a schematic diagram showing a modification similar to device L1 with a shorter proportioned parking device.
Fig. 5 shows a modification similar to parking devices L1 and L2, shown in Fig. 1, but with longer runways and an additional runway on each parking device, one position of a loading sequence being shown.
Fig. 6 shows a modification similar to parking device L1 shown in Fig. 1 but with a unit having a single runway that may support two cars.
Fig. 7 shows a modification similar to the parking device L1 shown in Fig. 1 but with a unit having a single runway that may support three cars.
Fig. 8 is a perspective elevational view showing parking device L1 with the runways in horizontal positions, the same as for Fig. 1.

Referring to the drawings in a general way, Figs. 1, 2, and 3 show a loading sequence for the vehicle parking devices L1 and L2, which may act together as a pair; that is, they may reciprocate in a manner to provide mutual assistance in loading their top runways. One parking device may be used alone when a suitable access level or levels are available, such as the second and third floor levels of the building shown to the left of the device L1.

Figs. 8 to 23 inclusive show details of the parking device. In general, this parking device shown has structural steel framing.

Parking devices L1 and L2 are alike, except that one is a right and the other a left, to make a pair since the tripping means for the automatic wheel stops S are staggered. Parking device or unit L2 has a lower runway R1 and an upper runway R2. Parking device or unit L1 has a lower runway R3 and an upper runway R4. In general, parking devices L1 and L2 are symmetrical about their centers; walkways and hydraulic cylinders constituting the main exceptions.

Although the parking devices L1 and L2 are each shown with two common sized vehicles on a runway, they may be also used with one vehicle, such as a very long car, or three small sized vehicles on a runway. When it is preferred to have a lesser slope or grade on the runways of such parking devices, they may be long enough for three common vehicles even if they are to be used in general for two vehicles. These parking devices with longer runways may be built economically with truss arrangements such as shown in the details. A parking device L1A is shown in Fig. 4, with one vehicle on a runway. The parking devices L1B, L2B, and L1D are shown with three vehicles on a runway.

Fig. 6 shows a single deck parking device with two vehicles parked on it.

In general, the packing devices shown are similar to those described in my above mentioned co-pending application. The improvements shown and described in this application include: tiltable and extendable end portions or aprons A1, A2, A3, and A4 that allow shorter runways that can be engaged to access levels automatically; automatic wheel stops S; power operated hydraulic cylinders PH; a movable weight mechanism W to balance or unbalance the runways; powered pulling mechanisms PM incorporated in the runways to pull vehicles along the runways; moment indicators N; an elevator E for operators; powered pulling mechanism attached to delaying action, pneumatic cylinder P to exert the force to unlatch the latches; economical A frame type supports for the runways; economical truss arrangements and additional safety devices including means to form steps from walkway sections 12 when tilted, and gates 3a and 4c on the runways at access areas.

Figures 9, 10:
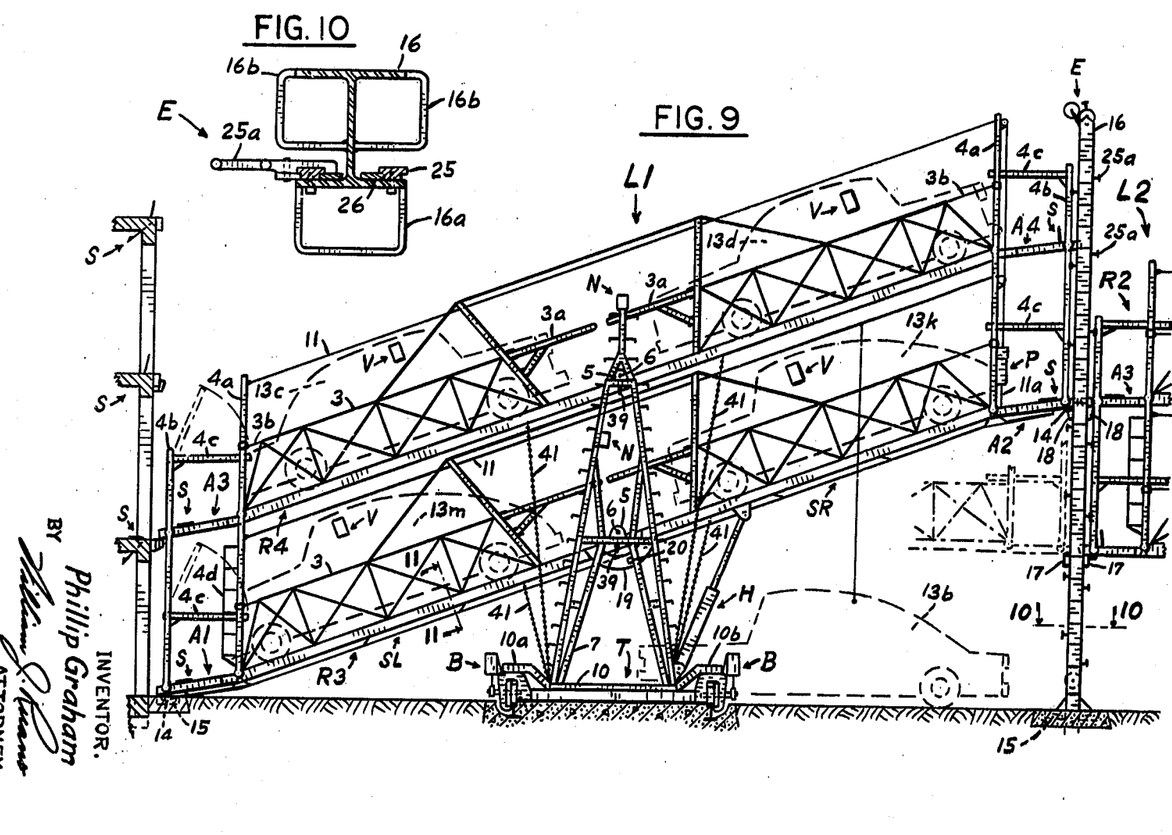
Fig. 9 is a fragmentary, sectional elevation showing parking device L1 in a tilted position, the same as for Fig. 2.
Fig. 10 is a sectional view taken along line 10—10 of Fig. 9.

The requirements for the contemplated use of the parking device for any particular installation will determine the base arrangement to be used. The wheel units B and the turntable T, as shown in Figs. 8 and 9, may be used on the base for the parking device to allow it to be moved along a stretch of track and to allow it to be rotated. The parking device, with or without a turntable, may be mounted on a roadway type truck or the like, thus making the device portable.

The turntable and carriage means for the parking device allows more selective positioning of the vehicles to and from the runways to thus eliminate moving cars that otherwise would block parking operations. The vehicles may be rotated so they may enter or leave the parking site front first. When conditions on a parking site allow no space for moving or rotating the parking devices, the devices may be anchored to the surface, thus omitting the turntable T and the wheel units B.

Figures 11, 12, 13, 14, 15, 16, 17, 18:
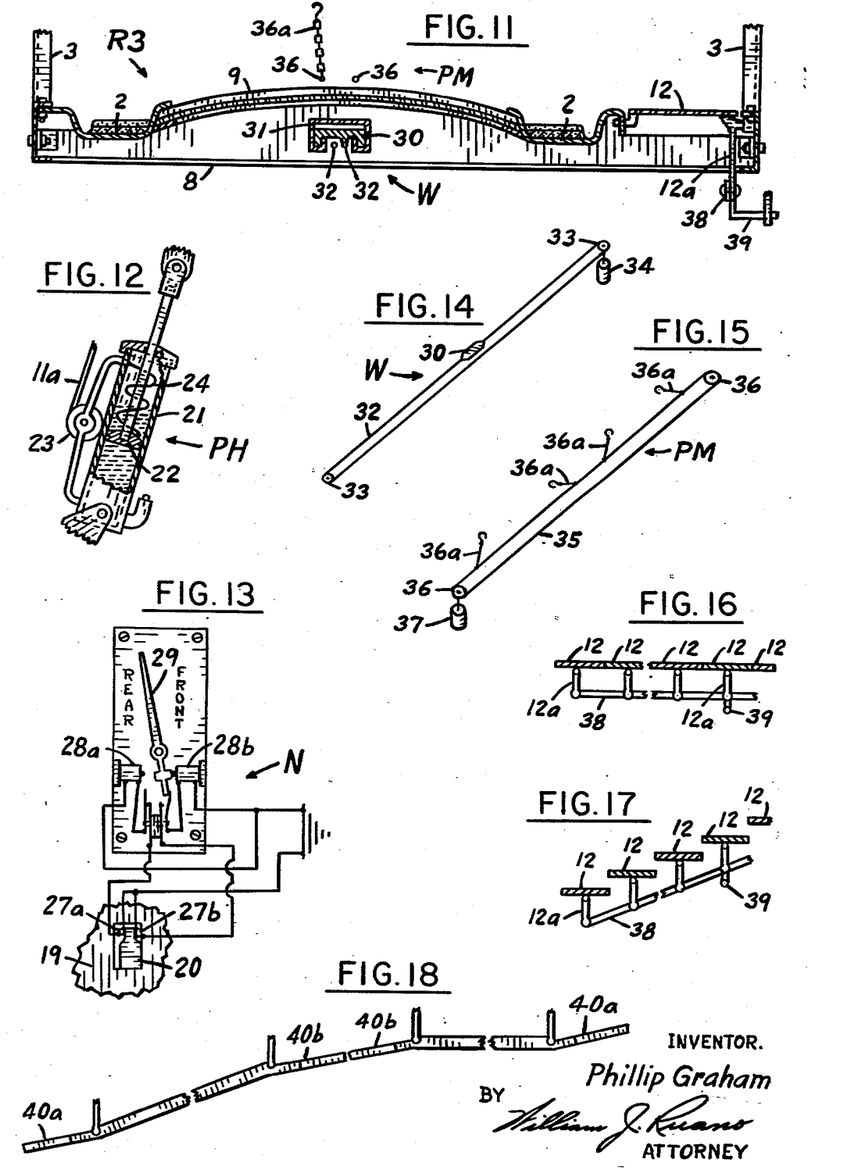
Fig. 11 is a sectional view taken along line 11—11 of Fig. 9.
Fig. 12 is a fragmentary elevational view showing a powered hydraulic cylinder.
Fig. 13 is an elevational view showing details of a moment indicator.
Fig. 14 is a schematic diagram showing a movable weight mechanism, used to vary the moments.
Fig. 15 is a schematic diagram showing a motorized means attached to a runway for powered moving of vehicles along the runway.
Fig. 16 is a schematic elevational diagram showing a walkway-stair mechanism as a walkway.
Fig. 17 is a schematic elevation similar to Fig. 16, but showing the walkway-stair mechanism as a stair.
Fig. 18 is a schematic elevational diagram showing tilted ends of adjacent runways.

Details of the parking device are shown in Figs. 8 to 23 inclusive. As shown in Fig. 11, runway R3 has two rails 2 which form a track for engaging the wheels of the vehicles parked on, or ramped over, this runway. Rails 2 are shown constructed of bent plates, similar in shape to a shallow trough or structural steel channel. The rails 2 may be lined with reinforced concrete with raised portions to form cleats. The concrete surface with the cleats offers traction for the vehicle tires, particularly in wet weather. Cleats form a bearing surface to prevent angle wheel blocks from sliding when under a load. Cleats may extend part of the width of the rail 2 so that part of the rail surface is flat to allow full drainage, to thus act as gutters to insure proper drainage of rain, snow and grease from the runways. Rails 2 are tied together by cross beams 8. The beams 8 frame into the bottom chords of the trusses 3. As shown in Fig. 9, the trusses 3 carry the loads to the pin plates 5, they also act as handrails and guard rails. The plates 5 are attached to the runways. Vertical link-post members 4a and 4b are pin connected to tie runways R3 and R4 together. The link-posts 4a also support the leads of the control cable 11.

Pin plates 5 transmit the load of the runway and of the vehicles on it to fulcrum pins 6. Fulcrum A frames 7 support the fulcrum pins 6 and thus the runway loads. The center decking 9 is arched for strength and drainage. The A frames 7 have ladder rungs. The lower part of the A frames 7 are fastened to channels 10. Channels 10 may be bolted down to the turntable T. When conditions are such that the turntable T is not usable, it may be omitted. When the parking device, without a turntable, is anchored to a site, its channels 10 are bolted to a concrete foundation. When the parking device has no turntable but is movable along a track and the like, the wheel units B may be fastened to channel extensions 10a and 10b. Walkway sections 12, shown in Figs. 16 and 17, are pivotally mounted so they act as steps when the runways are tilted.

The following detailed description will in general describe the arrangement with the parking devices L1 and L2 set up end to end to act together in loading the upper runways. The use of one parking device alone, with suitable access levels, has similarities that are obvious and thus only brief descriptions are made of that usage.

Vehicles shown in the various figures are situated as they would be if backed into position from the ground. When conditions on the parking site are such that the turntable T is used, the cars may be driven onto the parking device, front first and then the parking device may be rotated by its turntable, then the cars may be driven off it, front first.

The vehicles shown in the loading sequence diagrams are in such positions that they are creating greater moment arms than those shown unshaded.

The sequence, shown in Figs. 1, 2, and 3 for loading the parking devices L1, and L2 is as follows: Assuming that the runways for parking devices L1 and L2 are already positioned as shown in Fig. 1, vehicles 13a and 13b are driven under the runways. Vehicle 13c is backed up runway R1 onto runway R4 and placed in an extreme position, remote from the fulcrum so as to create a great moment. Next, while vehicle 13d is backed up runway R1 onto runway R4, it is positioned closer to the fulcrum than is vehicle 13c so that it will create a lesser moment than was created by vehicle 13c. Vehicle 13e is ramped up runway R1 to an extreme end position, to create a great moment. Then vehicle 13f is backed up to a position close to the fulcrum, creating a lesser moment. Locking devices keep unequal moments from tilting the runways until it is desirable to tilt them. These locking devices hold until the operator releases them by pulling the control cable 11, which is shown above the runways. This control cable 11 has leads which can be reached from any vehicle on the runways of the unit and from the ground. A delayed action, pneumatic cylinder P keeps the latching devices open for a short period to allow the tilting movement to begin.

Fig. 2 shows the position of the runways after the operator or operators have pulled the control cables 11 on parking devices L1 and L2, allowing the moments to cause the rotation of the runways. These operations are not simultaneous, since the runways on parking device L1 are tilted before parking device L2 is loaded. As shown in Fig. 2, another vehicle can be backed into position on the ground below runway R1. Then vehicles 13g and 13h are ramped up runway R3 onto runway R2, and suitably positioned. Next, vehicles 13k and 13m are ramped up runway R3 to suitable positions to create suitable moments; then the operator pulls control cable 11 on the parking device 11 thus unlocking its runways to allow their rotation to a horizontal position.

Fig. 3 shows both parking devices L1 and L2 and the ground level parking space filled, after another vehicle has been backed under runway R3. The removal of the vehicles is the reversal of a loading sequence. When the locking devices are released, the difference in moments exerted in opposite directions causes the rotation of the runways about the fulcrum pins 6. These moment positions are changed to suit loading requirements. Moments are changed by moving a vehicle on a runway to a suitable position, either toward or away from the fulcrum to change the moment arm.

Sequences other than those shown are possible for parking the vehicles. Either end of the runways may be tilted to the ground.

If parking devices or units L1 and L2 were set up between two buildings, without space for entering the runways from the extreme ends, the vehicles could be loaded on the runways from the center, between the parking devices L1 and L2. With that sequence, it would be necessary to load the vehicles on a lower runway, and then reverse the tilt on that runway to allow the vehicles to be moved to the top runway of the other unit.

Moment indicators N, shown in Figs. 9 and 13, automatically indicate which end of the parking device has the greater moment when the runway is loaded and is in a locked position. This will be described fully hereinafter.

When the parking device has unloaded runways, it can be tilted with little effort into a tilted position from the horizontal position.

A movable weight mechanism W (see Figs. 11 and 14) may be mounted on a runway to allow an unloaded parking device to be tilted by creating an unbalanced runway. The weight W is moved by a cable either manually or with motive power, as will be described later.

Vehicles may be pulled along the runways by the powered pulling mechanism PM, shown in Figs. 11 and 15.

This parking device has safety devices incorporated in it. They eliminate, to a large extent, the dangers that might result from carelessness or inexperience in operating the device. Some of these safety means may be omitted to suit the conditions where the parking device is used.

In modifications, building walls, columns, or hangers may act as fulcrum supporting members. Vehicles can be driven beneath the lower runway between A frames 7. The pair of A frames 7 use little space. Generally, they would use the space normally used by the parking lot operator as a walkway or access space between parked cars.

A runway center deck 9 acts as a walkway, drip-pan, and a roof for protecting the vehicle below. It also acts as a safety guard to prevent men or vehicles from falling through the runway, or as a third rail to support a vehicle wheel, such as the front wheel of a motor tricycle.

There are safety screens SR and SL under the runway R3.

The hydraulic cylinders H, which are hinge connected to A frames 7 at the base and to the trusses 3, are controlled by the pull on the cable 11. These cylinders H have valves to allow a bleeding action which retards the tilting movement of the runways to a safe rotating speed. The pull on the control cable opens the hydraulic valves in the piston heads. The moment causing the tilting movement of the runways forces the cylinder pistons down or up, the open valves allowing the bleeding action and thus the movement. To prevent too sudden a stoppage of the tilting movement which would strain the cylinders and the structure, a cushioning action is made by air pockets in the cylinders H. The bleeding action of the cylinders H can be stopped by a tripping means that is linked to the safety screens SR and SL, to prevent the accidental lowering of a runway end onto a vehicle or person on the ground level. The safety screens have strands of wire so rigged that they will contact any vehicle or person below the down-tilting end of the runway. When a strand of wire touches an obstruction or a strand of wire is pulled by a person, the pressure against the wires created by the obstruction or pulling force pulls a linkage arrangement which closes the valves on cylinder H. If conditions on the site are such that the runways are tilted to the ground for loading and unloading at one particular end only, the safety screen can be eliminated under the end of the runway that does not tilt to the ground.

Spring operated latches hold the parking device in the horizontal or tilted positions until the operator pulls the control cable 11. The feeder ends on the cable 11 are supported by pulleys. A pull on any of the feeder ends of cable 11 pulls the piston rod on the pneumatic cylinder P, and the piston rod pulls a cable 11a which, with its feeder ends or leads, pulls open all the latches and the hydraulic cylinders H. The cylinder P may have a motor to pull its piston and then trip free at the limit of the pull. The motor is switched on by pulling the cable 11. The piston in the pneumatic cylinder P has a spring that tends to force it to return to its original position. This return movement is retarded by air pressure caused by the piston sucking in air when the piston rod is pulled. A small opening in the cylinder allows the air under pressure to bleed out slowly and thus slowly release the pull on the cable 11a. After a short delaying period to allow the runways to start to tilt, the pull on cable 11a with its feeders to the latches is released enough by the cylinder P to allow the springs in the latches to pressure their bolts, so that when the slots in the catches come in registry, the latch bolts will spring into them. To tilt past the horizontal latching means, the operator pulls the control cable 11 a second time as he nears the horizontal position, thus keeping the latches open and passing these catches. The feeders from cable 11a to the hydraulic cylinders H1 are nearly taut; the feeders from cable 11a to the latches have more slack, the valves on the hydraulic cylinders H open before the latches and close after the latches have engaged the catches. The safety screens SR and SL, pneumatic cylinder P, and the hydraulic cylinders H are fully shown in my above mentioned co-pending application, Serial No. 248,416, filed September 26, 1951, entitled Vehicle Parking Device.

Spring operated latches 14 are on the bottom runway, near the ends. When the latches and the catches are positioned in registry by the various tilted and horizontal runway positions, the latches engage the catches 15 which are anchored to the ground or floor surface. When columns 16 are used, latches 14 may latch to catch plates 17 or 18 that are mounted on the columns. The latches 14 are offset to clear the wheel stops S. The catch plates 19 on the center of the A frames 7 engage the spring operated latches 20 that are mounted on the trusses 3. All the latches may have resilient mountings to cushion the shock when stopping the tilting movement of the parking device.

The columns 16 are centered between the parking devices L1 and L2. They may be omitted when conditions are such that the columns would be obstructions to the uses of the ground level, such as when the surface between the parking devices L1 and L2 is used as a driveway. Columns such as 16 may be used at the extreme ends. The use of columns 16 allows the end latching of the parking device for various positions which is an added safety factor. This end latching would reduce the stresses on latches 20, and help restrain the A frames 7 from tilting from unequal loading and thus be the means to reduce the size of strength members of the parking device. In modifications, the latching, supporting and access means of columns 16 may be incorporated in walls or hangers, thus eliminating the columns.

Where safety requirements demand more flexible control of the tilting action of the runways, powered means may be used that can quickly be reversed. The power means may be used to retard the tilting action, also it may be used to tilt the runways without relying on the moments of the cars. Power operated hydraulic cylinders such as cylinders PH, shown in Fig. 12, may be used in place of non-powered bleeding cylinders H. A cylinder PH has a cylinder 21, a piston 22, a pump and reversing motor means 23, and a flexible tube 24. The motor would be switched on and off by the pull of cable 11a. A second system of control cables may be placed next to cables 11 and 11a to allow the operator to quickly reverse the motor or stop it. The safety screens SR and SL may have their tripping means operate a switch to stop the motor. The pump 23 has tubular connections to the top and bottom of the cylinder 21. Fluid is pumped from the bottom to the top or vice versa to force the piston 22 down or up and thus tilt the runways. The flexible tube 24 has its lower end always engaging the fluid so as to allow pumping action.

The columns 16 may have ladder rungs 16a and 16b and an elevator E as shown in Figs. 9 and 10. Thus the columns 16 may be an access means to and from the runways. The A frames 7 have rungs to allow access to the runways. The A frame 7 has access means through its center when a building or stairs is adjacent. The trusses 3 have a portal arrangement at their center to allow head room at the access to ladder rungs on the A frames 7. Inwardly self-closing swinging gates 3a are attached to the trusses 3 at the portals. Sliding members 3b slidably engage the trusses 3 and the links 4a to provide railing means. Self-closing lift gates 4c swing from links 4b. A ladder 4d may be used as an access means to runway R4.

The elevator E has an endless chain 25 which engages a track 26 on column 16. Suitably spaced projecting links 25a act as foot rests and hand gripping means for the operator. There is a motor drive at the top of the column 16.

Moment indicators N may be fastened to A frame 7, as shown in Fig. 9. They operate when the runways are locked to a position to indicate which end of the parking device has the greater moment arm. These indicators N are visible by the operators so as to allow the operators to move vehicles to reverse the moments when necessary before unlatching. An enlarged detail of an indicator N is shown in Fig. 13. Microswitches 27a and 27b are fastened to the bolt of the latch 20. There is a slight amount of play between the latch bolt and the slots in catch plate 19, and when the runways are unbalanced the bolt on the latch 20 will bear firmly against a side of the slot. When the moments are reversed on the runways, the latch bolt will bear against the reverse side of the slot. One of the microswitches will be actuated by contacting a side of the slot, thus closing an electric relay which energizes electro-magnets 28a or 28b. The magnets pivot the indicator needle 29. Suitable batteries or other electric power source is used.

The movable weight mechanism W is shown in Fig. 14. It is a means to tilt or level the runways when they are empty. The mechanism W has a movable weight 30 which engages a track 31 that is attached to the underside of the center of the runway as shown in Fig. 11. The weight 30 is moved to balance or unbalance the runways. The weight 30 has a cable 32 attached to each end. The cable 32 is rigged to pulleys 33. A reversible motor 34 rotates a pulley to thus pull the cable and the weight.

The powered pulling mechanism PM, shown in Figs 11 and 15, is a means to pull vehicles along a runway and to hold them in place after they are positioned. An endless chain 35 engages sprockets 36. The sprockets are attached to the runway. A reversible motor 37 drives a sprocket 36 and thus the chain. Short removable chains 36 are hooked to chain 35 and then hooked to the bumpers or axles of the vehicles being positioned on the runway.

The walkway sections 12 are shown in Figs. 11, 16, and 17. These sections 12 remain in a horizontal position when the runway tilts. They form steps as shown in Fig. 17. A section 12 has an arm 12a which is pivotally connected to bar 38. The arm 12a at the center of the runway has an offset 39 fastened to it. The offset 39 engages a slotted hole in the projected plate on A frame 7, thus the sections 12 are restrained from tilting.

The parking devices may have tiltable counter weighted stairs similar to fire escape stairs. Such stairs would be particularly suitable for a single deck device as shown for device L1D in Fig. 7.

When the ground level between the parking devices L1 and L2 or modifications of these devices is a street or the like that cannot be obstructed by parking operations, the runways may have permanently tilted end portions or aprons 40a and 40b as shown in Fig. 18. These tilted end portions 40a and 40b save valuable space as they allow the use of steeper, and shorter runways since they provide clearance means for the passage of the lower parts of vehicles. The shorter runways save valuable space and the runways use less material and are less costly. Without these tilted end portions 40a and 40b the bumpers and the car side framing between the front and rear wheels of many vehicles would snag onto the runways. The lower tilted end portion is needed more than the upper tilted end portion since the long overhanging rear and front of a modern car must be kept clear of the runway. Car springs deflect when a car reaches the bottom of a steep slope thus decreasing the clearance.

Figure 19:
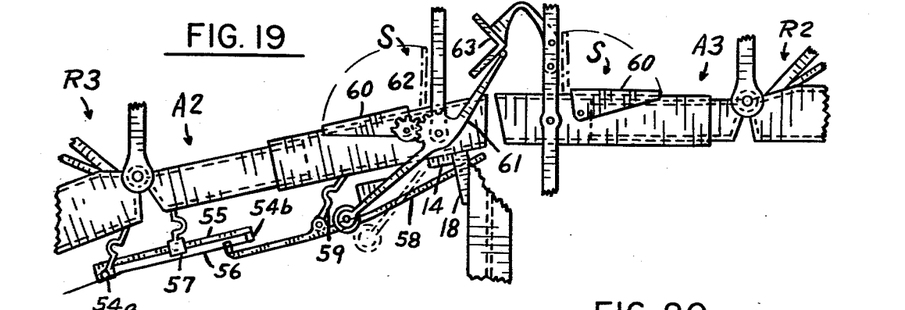
Fig. 19 is a fragmentary sectional elevation showing adjacent ends of runways R2 and R3.
Figure 20:
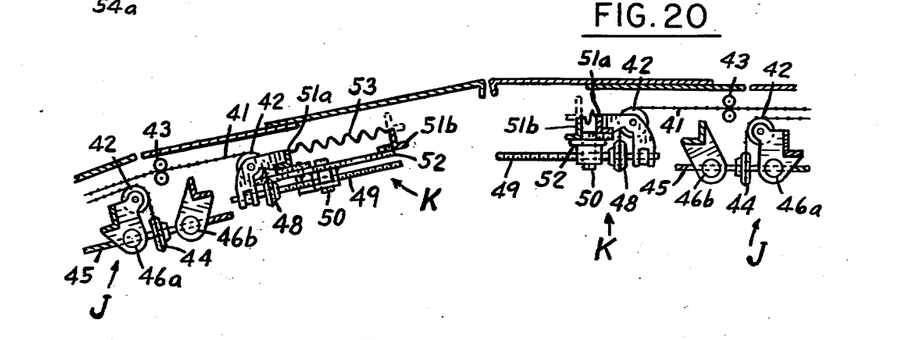
Fig. 20 is a schematic, fragmentary, sectional elevational view showing automatic jacking means for tilting and lengthening the end aprons.
Figures 21, 22, 23:
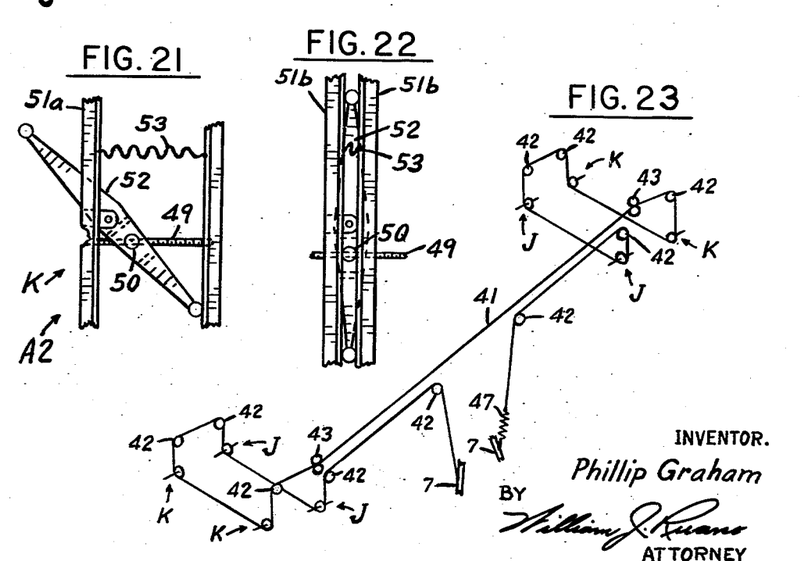
Figs. 21 and 22 are schematic plan views showing means to lengthen the runway aprons.
Fig. 23 is a schematic view showing the mechanism that automatically tilts and extends the aprons.

When the runways are tilted to load from both ends, the ends of the runways may have reversible end portions or tilting aprons, as shown in Figs. 9 and 19. The runway R3 may have the tiltable apron A1 hinged to the lower end, and the tiltable apron A2 hinged to the upper end. The runway R4 may have aprons A3 and A4, which are similar to aprons A1 and A2. When a vehicle is backed onto the lower end of the runway R3 that is positioned as shown in Fig. 9, the tilted apron A1 forms a hump that raises the back wheels of the vehicle enough to allow the long over-hanging rear and front portions of the vehicle to clear the runway. When a vehicle is ramped over the upper end of runway R3 to runway R2, the tilted apron A2 allows clearance for the lower underside of the vehicle between the front and rear wheels. When the parking device is rotated to a horizontal position, the aprons level out to a horizontal plane. As shown in Figs. 19, 20, and 23, the aprons A1 and A2 are tilted automatically when the runway is tilted, by means of the screw jacks, J. Structural steel angles 51 support the jacks. The jacks J have sprockets that are turned by the chain 41. The chain 41 with a spring 47 is rigged with the pulleys 42 and the pairs of pulleys 43 which are attached to the runway. The chain 41 and spring 47 are anchored to the A frame 7. The distances from these anchorages to the closest pulleys 42 will shorten and lengthen when the runway is tilted. Thus the unequalizing of these distances causes movement of chain 41 in its relationship to sprockets 44 and thus causes the sprockets 44 to rotate and turn the threaded shafts 45. The shafts 45 each have right hand and left hand threads to engage pivotally mounted nuts 46a and 46b. The screw-jack action thus tilts the aprons in opposite directions. In modifications (not shown) only one deck on each parking device need have jacks with the other aprons on the other deck tilting by means of the links 4b.

As shown in Fig. 9, the fulcrum pins 6 are positioned just above the runways. This is the approximate position of the center of gravity for a loaded or unloaded runway. A high position for the fulcrum pins such as a position equal to half the distance between decks would cause considerable reversal of moments of a tilted loaded runway. Since the ends of runways are engageable horizontally and diagonally with those on the adjacent parking device, a means to lengthen the runway automatically when it is positioned diagonally is advantageous. The aprons A1, A2, A3, and A4, also the end portions 40a and 40b may be automatically extended and retracted by means of the jacks K. Jacks K are shown in Figs. 20, 21, 22, 23.

The jacks K are shown operated by the chain 41, with the chain turning the sprockets 48. Sprocket shaft 49 is threaded at one end to engage a pivotally mounted nut 50. The structural angle 51a supports the rocker 52. The rocker 52 is rocked by the screw action of the shaft 49 in its engagement with the nut 50 that is mounted off the center of the rocker 52. A spring 53 tends to retract the extended telescoping end of the apron. As shown in Fig. 21, an offset on an end of rocker 52 engages angle 51b and forces it outwardly, thus extending the apron A2 in length when the runway R3 is tilted as shown in Figs. 19 and 20. Angle 51b may be slidably mounted, so that it may be moved upwardly with a manual or powered jack (not shown) to disengage it from the offset on rocker 52 when no extending action is wanted.

Fig. 22 shows the rocker 52 in a neutral position for the apron A3 shown in the horizontal position in Figs. 19 and 20. The rocker 52 tilts in an opposite direction from that shown in Fig. 21, when tilting oppositely as apron A1 is tilted.

The extending of the lower deck aprons requires a modified arrangement for the safety screen SR. Cross members 54a and 54b are connected to diaphragms 55. Wire strands 56 are supported by member 54a and anchored to member 54b. The diaphragms 55 are slidably engaged with resilient supports 57. Rockers 58 are pivotally supported by resilient supports 59. An end of rocker 58 is slidably engaged with wire 56, thus when the rocker 58 engages an obstruction below the runway, it tightens the wire 56 and the wire trips the controls to stop the tilting action.

The ends of runways may have automatic wheel stops S. The wheel stops S are a safety means to prevent vehicles from accidentally rolling off, or being driven off, the open end of a runway. These stops S are automatically lowered when there is an access level adjacent to the end, and they are raised automatically to block the runway end when no passage of vehicles can be made. A wheel stop S, as shown in Fig. 19, has a pivotable flap 60 which spans the width of the runway. It is hinged to the tiltable apron A2. A lever 61 is rotated slightly to raise the flap 60. The lever 61 has a gear-like hub part that engages a gear 62 that is keyed to an end of the flap 34. The lower end of the lever 61 is weighted to raise the flap 60 or to keep it raised except when pressure on the lever counteracts this weight and lowers the flap. An offset on the upper end of the upper arm on the lever 61 engages the V-shaped cam-like part 63 which is attached to the adjacent runway R2. As the tilting movement of the runway brings the adjacent runways into alignment, the offset on lever 61 slides along the cam 63 and moves away from the flap 60. This causes the lever movement that turns the gear 62 and thus rotates the flap 60 to a lowered or retracted position. The raised position of flap 60 is shown by the dot-dash outline. The cam 63 engages this lever 61 either from above or below. When the adjacent end of the runway R2 is rotated down past this position, the offset on the end of lever 61 moves further out until it rounds the sharp part of the V on the cam 63 and thus it disengages and the weight on the lower part of lever 61 forces the raising of the flap 60. When the lever 61 is on an end of a runway that can be tilted to the ground, the lower end of the lever 61 may have a wheel as shown to prevent it from snagging the ground, or it may be used without a wheel if it is shaped to slide along the ground. When the wheel or the lower end of lever 61 is forced down to the ground by the tilting of the runway, a lever movement is made that lowers the flap 60. The upper end lower arms of the lever 61, and the supporting arm for the cam 63, should be resilient to allow them to bend if a vehicle wheel is touching the flap 60 that is in a locked position, and it is not free to rotate down. Each bridgable end of all runways may have a wheel stop S. Non-bridgable ends may have stops S or less costly fixed stops (not shown). Elevated access levels may also have wheel stops S. The tripping means for the wheel stops of the adjacent runways ends are staggered so they cannot foul one another.

The mechanism of the wheel stop S is almost balanced so that little pressure on the lever 61 lowers the flap 60. As a matter of precaution, angle-iron wheel blocks may be used at both front and back of one rear wheel on each vehicle to prevent vehicles from accidentally moving while they are parked. These angle wheel blocks may be fastened together with a chain. The chain helps the operator to pull both the angle-iron blocks from under the wheel with less risk of a hand injury which might result from the sudden movement of the parked vehicle. Warning devices, similar to vehicle curb feelers, may be attached to the A frames 7 and the trusses 3.

Visual devices V, shown on vehicles in Fig. 9, are another safety means that may be used to more safely move vehicles onto and off of the parking device. A visual device V has a front and a rear view mirror to allow the operator in the driver's seat to simultaneously view the front and rear parts of a side of the vehicle and its proximity to the parking device framework. It has two illuminating light beams to light up the vehicle side areas and the adjacent runway areas that are reflected in the mirrors. A device V may be quickly hung onto a vehicle side window before parking. The visual device V is fully shown in my above mentioned co-pending application.

When a parking device fulcrum base is on a low level that is unsuitable for parking, and it is one level or more below the access level or driveway, the runways may be used without means to use the ground level. No safety screens are required for such an arrangement.

When the parking devices are in a tilted position, they may be used to ramp vehicles to and from a higher level without rocking the runways. They can be used without rocking as a fixed ramp or parking surface. They can be rotated but not rocked after loading to position for ramping from one level to another. They can be moved along a stretch of driveway and the like without rocking, after loading, to position for ramping or parking.

Modified parking devices (not shown) may be made similar to the parking device L1, but without the rockable runways.

The runways on parking device L1A, shown in Fig. 4, are positioned halfway between adjacent levels. There is no space below the lower runway for parking and other such useful purposes.

This parking device L1A takes less space than does the device L1. The short cantilevered runways require far less than half as much material as the runways on the device L1. The fulcrum is much smaller and less costly. This device L1A is most useful to ramp vehicles to and from various levels of a structure.

The fulcrum base may be made to suit the conditions where it is to be used. It may make use of the turntable T, the wheel units B, or, in modifications, it may be based on a truck. Any or all of these moving means may be omitted, and the base may then be bolted in a fixed position to a foundation. It may make use of the building columns or walls as fulcrum members. With an empty parking stall on the second level, it would be an economical means to allow self parking. When a structure has only two levels, a modified parking device would be used. It would be similar to device L1A, except that it would have one runway. Modified parking devices, similar to device L1A, may be used, in pairs, as are devices L1 and L2.

Figure 24:
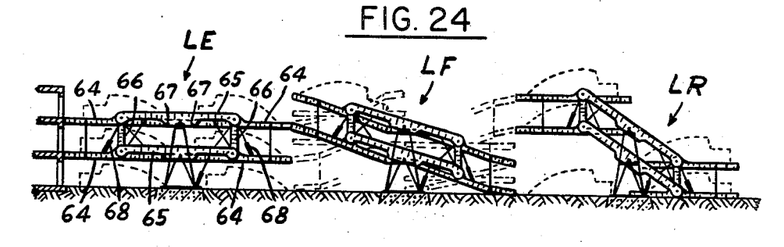
Fig. 24 shows three parking devices and involving a modification of those shown in Fig. 1.

The nearly identical parking devices LE, LF, and LR shown in Fig. 24, are modifications of parking devices L1 and L2. These devices LE, LF, and LR differ from L1 in that each runway is made up of two runway sections 64. These sections 64 would be substantially the same as a whole runway of the parking device L1A shown in Fig. 4. The rocking beam members 65 are pivotally supported on A frames and they are linked together by links 66. The runway sections 64 are pivotally supported by the beams 65. The upper and lower sections 64 are linked together. The sections 64 are latched to the beams 65 with latches 67. Hydraulic cylinders 68 engage the sections 64.

The parking devices LE, LF, and LR may be operated substantially the same as that for the parking devices L1 and L2, or they may be operated otherwise as illustrated by the positioning of the device LR and the variable positioning of the sections 64 as shown in the dot-dash lines on the device LF. Cars may be ramped onto the device, and then the latches 67 may be released to allow a set of sections 64 to rotate or tilt to a horizontal position or to an oppositely positioned tilted position.

The independent tilting of the sets of sections 64 allows shifting of cars from the lower runway to the upper and vice versa. This shifting means allows more flexible loading and unloading of cars as it eliminates the blocking of upper cars by both of those on the lower runway.

A parking device LE would be more useful than a pair of devices L1A, as it allows enough space under the lower runway to park cars and the like.

The parking devices LE, LF, and LR may be operated with the runway sections 64 being kept in a horizontal position. The cylinders 68 being locked and the latches 67 being disengaged. Powered lifting means is used, that is similar to cylinders PH. All the hydraulic cylinders on these devices may be similar to cylinders PH, with a bleeding valve by-passing the pump. Thus the cylinders' bleeding valve can be closed for power movement and the powered mechanism can be shut off when the bleeding valve is opened for non-powered tilting cylinders.

The catch plates similar to catch plates 19 (see Fig. 9) would have additional catch slots to allow intermediate positioning. The sets of sections 64 would have similar catch plates also.

The safety screens for the parking device LE and the like would have modified rigging to stop all tilting sections. The extendable aprons would be a means to bridge to various levels. The angles 51b would be jacked up by powered means remotely controlled on the adjacent ends of runway sections 64, when the sections 64 are latched to the beams 65, to thus halt the extending action. The latches 67 would be located near the ends of the tiltable aprons to allow tilting action. Automatic wheels stops may be mounted at the end of each section 64. Movable weights may be mounted under sections 64. The parking device LE may be mounted on a turntable or a carriage if lateral movement is desirable.

The parking device LE and the like may be used similar to the device L1 during dry weather, and during slippery weather they may be used with the runway sections 64 being kept horizontally, thus eliminating the need to move cars on steep slippery ramped runways.

Figure 25:
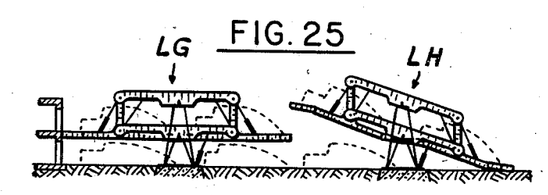
Fig. 25 shows a modification that has a pair of single deck units, similar to the device L1C shown in Fig. 6.

The parking devices LG and LH shown on Fig. 25 are similar to devices LE and LF, except that they have a single runway each.

Figure 26:
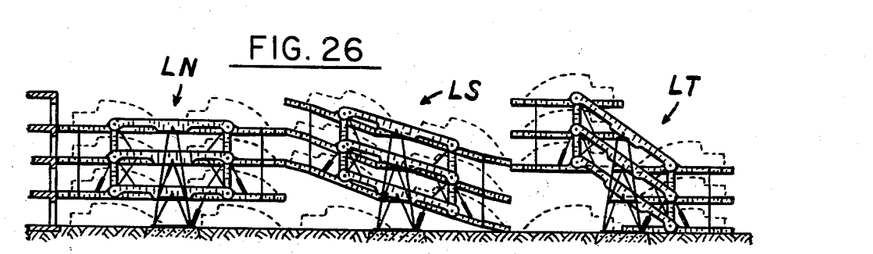
Fig. 26 is a schematic elevational view showing three, three tier parking devices that are similar to the two tier parking devices shown in Fig. 24.

The three deck parking devices LN, LS, and LT in Fig. 26 are similar to the device LE.

Figure 27:
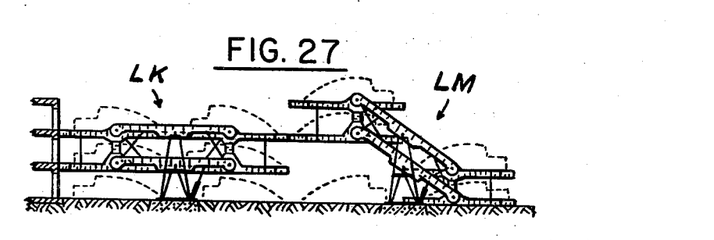
Fig. 27 shows a modification that has similarities to the parking devices shown in Fig. 24.

The nearly identical parking devices LK and LM shown in Fig. 27 are similar to the device LE.

They differ in that the runway sections are fixed to the vertical links and they remain horizontal at all times. No cylinders 68 are needed. The runway sections may have extendable end portions, but no tilting of end portions is required. The runways may be shorter than those for the device LE. Powered cylinders would be used.

Figure 28:
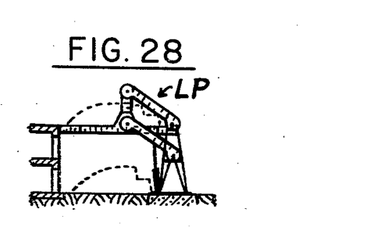
Fig. 28 is a schematic, elevational view showing a one car parking device that is similar to the parking devices shown in Fig. 25.

The single car parking device LP shown in Fig. 28 is similar to devices LK and LM except that it has a runway about half as long and it is off center.

Thus I have provided an efficient and economical parking device which allows storing and parking of a large number of vehicles in a relatively small space; furthermore I have provided a parking device which is similar to a teeter-totter with one, two, three or more runways, so as to enable parking or storing of a selective number of tiers of cars; also I have provided a parking device which is safe to operate and which is relatively foolproof, that is, it has necessary safety features for protecting both the operator and the vehicles against injury or damage; also I have provided a parking device which is movable laterally.

While I have illustrated and described several specific embodiments of my invention, it will be understood that these are by way of illustration only, and that various changes and modifications may be made within the contemplation of my invention and within the scope of the following claims.

I claim:

1. A vehicle parking device comprising a vertically arranged parallelogram linkage having two vertically extending links and two links extending transversely thereof and pivoted thereto, means for pivotally supporting said linkage at central portions of said transversely extending links, a pair of horizontal platforms, each mounted on one of said vertically extending links and each being sufficiently long to support a vehicle thereon and supported sufficiently high so as to provide space for storing two vehicles underneath both when both platforms are moved to the same horizontal plane, and when in said plane, the inward ends of said platforms being sufficiently adjacent each other, to permit a vehicle to be wheeled from one platform to the other, and power operated means for tilting said linkage about said pivotal supporting means.

2. A vehicle parking device comprising a vertically arranged parallelogram linkage having two vertically extending links and two links extending transversely thereof and pivoted thereto, means for pivotally supporting said linkage at central portions of said transversely extending links, a pair of horizontal platforms, each rigidly secured to one of said vertically extending links and each being sufficiently long to support a vehicle thereon and supported sufficiently high so as to provide space for storing two vehicles underneath both when both platforms are moved to the same horizontal plane, and when in said plane, the inward ends of said platforms being sufficiently adjacent each other, to permit a vehicle to be wheeled from one platform to the other, and power operated means for tilting said linkage about said pivotal supporting means.

3. A vehicle parking device comprising a vertically arranged parallelogram linkage having two vertically extending links and two links extending transversely thereof and pivoted thereto, means for pivotally supporting said linkage at central portions of said transversely extending links, two pairs of horizontal platforms, each pair being rigidly secured to one of said vertically extending links and having a vertical spacing of at least the height of a vehicle, each platform being sufficiently long so as to support a vehicle thereon, the lowermost platforms being supported sufficiently high so as to provide space for storing two vehicles underneath when the lowermost platforms are moved to the same horizontal plane, and, when in such plane, the inward ends of said platforms being sufficiently adjacent each other so as to permit a vehicle to be wheeled from one platform to the other and power operated means for tilting said linkage about said pivotal supporting means.

4. A vehicle parking device comprising a vertically arranged parallelogram linkage having two vertically extending links and two links extending transversely thereof and pivoted thereto, means for pivotally supporting said linkage at central portions of said transversely extending links, a pair of platforms, each pivotally mounted on one of said vertically extending links and each being sufficiently long to support a vehicle thereon and supported sufficiently high so as to provide space for storing two vehicles underneath both when both platforms are moved to the same horizontal plane, and when in said plane, the inward ends of said platforms being sufficiently adjacent each other, to permit a vehicle to be wheeled from one platform to the other, power operated means for tilting said platforms with respect to said vertically extending links in order to permit a vehicle to be ramped from one platform to the other, and power operated means for tilting said linkage about said pivotal supporting means.

(References on following page)

References Cited in the file of this patent

UNITED STATES PATENTS

| | | |
|---|---|---|
| 298,212 | Knight | May 6, 1884 |
| 753,197 | Gilman | Feb. 23, 1904 |
| 1,164,143 | Swift | Dec. 14, 1915 |
| 1,288,567 | Hall | Dec. 24, 1918 |
| 1,290,267 | McFarland | Jan. 7, 1919 |
| 1,389,532 | Roberts | Aug. 30, 1921 |
| 1,398,166 | Winchel | Nov. 22, 1921 |
| 1,550,040 | Nagy | Aug. 18, 1925 |
| 1,683,492 | Ruth | Sept. 4, 1928 |
| 1,782,671 | Allred, Jr. | Nov. 25, 1930 |
| 1,987,376 | Stearns | Jan. 8, 1935 |
| 2,107,465 | Borggaard | Feb. 8, 1938 |
| 2,373,148 | Smith | Apr. 10, 1945 |
| 2,449,829 | Agren | Sept. 21, 1948 |
| 2,613,827 | Van Doorne | Oct. 14, 1952 |
| 2,695,716 | Graham | Nov. 30, 1954 |